United States Patent [19]

Harrell, Jr.

[11] 4,381,378

[45] Apr. 26, 1983

[54] METHOD FOR VULCANIZING ETHYLENE/ACRYLIC OR VINYL ESTER/GLYCIDYL(METH)ACRYLATE COPOLYMER WITH PIPERAZINIUM DICARBOXYLATE SALT AND COMPOSITION FOR SAME

[75] Inventor: Leon L. Harrell, Jr., Wilmington, Del.

[73] Assignee: E. I. Du Pont de Nemours and Company, Wilmington, Del.

[21] Appl. No.: 334,893

[22] Filed: Dec. 28, 1981

[51] Int. Cl.³ .............................................. C08L 33/08
[52] U.S. Cl. .................................................... 525/375
[58] Field of Search ......................................... 525/375

[56] References Cited

U.S. PATENT DOCUMENTS

| | | | |
|---|---|---|---|
| 2,849,426 | 8/1958 | Miller | 260/79.5 |
| 2,856,309 | 10/1958 | Gleason et al. | 106/285 |
| 2,981,721 | 4/1961 | Brown | 260/80.7 |
| 3,440,200 | 4/1969 | Lindemann et al. | 260/29.6 |
| 3,498,875 | 3/1970 | Lindemann et al. | 161/170 |
| 3,519,610 | 7/1970 | Huntzinger | 260/89.5 |
| 3,645,952 | 2/1972 | Lindemann et al. | 260/29.6 T |
| 3,761,454 | 9/1973 | Geri et al. | 260/80.77 |
| 3,883,472 | 5/1975 | Greene et al. | 260/42.52 |
| 4,026,851 | 5/1977 | Greene | 260/23 AR |
| 4,070,532 | 1/1978 | Hammer | 526/11.2 |
| 4,157,428 | 6/1979 | Hammer | 521/134 |

Primary Examiner—Maurice J. Welsh

[57] ABSTRACT

Elastomeric ethylene/acrylic or vinyl ester/glycidyl(meth)acrylate copolymers, optionally containing carbon monoxide moieties, are used with piperazinium dicarboxylate salts, e.g. piperazinium diacetate.

12 Claims, No Drawings

METHOD FOR VULCANIZING ETHYLENE/ACRYLIC OR VINYL ESTER/GLYCIDYL(METH)ACRYLATE COPOLYMER WITH PIPERAZINIUM DICARBOXYLATE SALT AND COMPOSITION FOR SAME

DESCRIPTION

1. Technical Field

This invention relates to vulcanizable elastomeric compositions and to a method of curing such compositions, which method is fast and has satisfactory processing safety (scorch resistance), the composition comprising an ethylene/acrylic or vinyl ester/glycidyl(meth)acrylate copolymer, and, optionally, carbon monoxide, and the method of curing such copolymers comprising reaction of the compositions of the present invention with certain piperazinium dicarboxylate salts.

2. Background Art

Copolymers of ethylene, an acrylic or vinyl ester, glycidyl(meth)acrylate and, optionally, carbon monoxide are disclosed in U.S. Pat. No. 4,070,532 and U.S. Pat. No. 4,157,428 issued Jan. 24, 1978 and June 5, 1979, respectively, both to Hammer. These copolymers are normally vulcanized in the presence of metal oxides or hydroxides or polyamines, corresponding ionic crosslinks being formed. U.S. Pat. No. 3,761,454 issued Sept. 25, 1973 to Geri et al. discloses vulcanizable compositions comprising a fluorinated interpolymer and a vulcanizing system consisting of a piperazinium carbamate, oxalate, formate or acetate salt and a bivalent metal oxide. Vulcanizable compositions of an ethylene/acrylic or vinyl ester/glycidyl(meth)acrylate/carbon monoxide copolymer and a piperazinium dicarboxylate salt are not described in any of these patents.

DISCLOSURE OF THE INVENTION

The copolymers vulcanized according to this invention contain by weight (a) from 30 to 70%, preferably 35 to 50%, of ethylene; (b) from 25 to 65%, preferably 50 to 60%, of any acrylic ester or vinyl ester; (c) from 2 to 10%, preferably 2 to 5%, of glycidyl acrylate or methacrylate and most preferably 3 to 3.5% glycidyl methacrylate; and (d) from 0 to 15%, preferably 5 to 10%, of carbon monoxide, the weights of (a), (b), (c) and (d) adding up to 100%.

Acrylic esters include alkyl acrylates or methacrylates wherein the alkyl group contains from 1 to 4 carbon atoms. Specific examples include methyl acrylate, ethyl acrylate, propyl acrylate, isopropyl acrylate or a butyl acrylate, ethyl methacrylate, propyl methacrylate, isopropyl methacrylate or a butyl methacrylate. Suitable vinyl esters include vinyl acetate, vinyl propionate and vinyl butyrate.

The preferred copolymers of the present invention will contain by weight approximately 44.5% ethylene, 52.1% methyl acrylate or vinyl acetate and 3.4% of glycidyl methacrylate.

The copolymers of the present invention can be prepared by copolymerizing ethylene, a comonomer solution of the acrylic ester or vinyl ester and glycidyl(meth)acrylate and, when present, carbon monoxide in a methanol-t-butanol solvent mixture in a pressure reactor at 160° to 225° C. and a pressure of 150 to 200 MPa in the presence of a free-radical polymerization initiator as generally described in U.S. Pat. No. 3,883,472 to Greene and Lewis and U.S. Pat. No. 4,026,851 and U.S. Pat. No. 3,904,588, both to Greene. The comonomer solution preferably contains from 22 to 44 ppm of a stabilizer such as phenothiazine. The free radical polymerization initiator is dissolved in a mixture of methanol and t-butanol. The polymerization is run as a continuous process wherein ethylene, comonomer solution, solvent and initiator solution are fed continuously into the stirred autoclave. The addition rates depend on variables such as the polymerization temperature, pressure, monomers employed and the concentration of the monomers in the reaction mixture. The reaction mixture is continuously removed from the autoclave and is stripped of unpolymerized monomers and solvent under reduced pressure and at elevated temperature.

For example, a 44.5 weight percent ethylene/52.1 weight percent methyl acrylate/3.4 weight percent glycidyl methacrylate copolymer having a melt index of 8.7 was prepared by continuously feeding ethylene, methyl acrylate, glycidyl methacrylate and t-butyl alcohol/methyl alcohol solvent (80/20 by weight) into a stirred autoclave at 186 MPa and 179°–180° C. at feed rates of 12.6 kg/s×$10^4$, 1.56 kg/s×$10^4$, 0.082 kg/s×$10^4$ and 3.02 kg/s×$10^4$, respectively. Tert-butyl peroxypivalate initiator was introduced continuously at a rate 0.5–0.6 kg per 100 kg of copolymer. The reaction mixture was continuously removed from the autoclave and was stripped of unpolymerized monomers and solvent under reduced pressure and at elevated temperatures. Details of the synthesis of this copolymer and three others is summarized in Table I.

TABLE I

COPOLYMER SYNTHESIS

| Copolymer No. | Copolymer Type | Product Copolymer Monomer Ratio (Wt., %) | Melt Index | Reaction Conditions Pressure MPa | Temp. (°C.) | PL Initiator Demand[1] | Feed Rate, kg/s × $10^4$ E | MA | CO | GMA | Solvent[2] | Conversion % |
|---|---|---|---|---|---|---|---|---|---|---|---|---|
| A | E/MA/GMA | 44.5/ 52.1/ 3.4 | 8.7 | 186 | 179–180 | 0.5–0.6 | 12.6 | 1.56 | — | 0.082 | 3.02 | 11.3 |
| B | E/MA/GMA | 43.6/ 53.8/ 2.6 | 6.9 | 186 | 180–181 | 0.36–0.55 | 12.6 | 1.57 | — | 0.063 | 3.25 | 11.3 |
| C | E/VA/GMA | 68.7/ 28.6/ 2.7 | 25.5 | — | — | — | — | — | — | — | — | — |
| D | E/MA/CO/ GMA | 58.6/ 29.6/ 7.4/ | 2.6 | 172 | 190–192 | 2.80–2.94 | 17.6 | 1.02 | 0.39 | 0.15 | 2.82 | 12.4 |

TABLE I-continued
COPOLYMER SYNTHESIS

| Copolymer No. | Copolymer Type | Product Copolymer Monomer Ratio (Wt., %) | Melt Index | Reaction Conditions Pressure MPa | Temp. (°C.) | PL Initiator Demand[1] | Feed Rate, kg/s × 10^4 E | MA | CO | GMA | Solvent[2] | Conversion % |
|---|---|---|---|---|---|---|---|---|---|---|---|---|
| | | 4.5 | | | | | | | | | | |

PL = t-butyl peroxypivalate; E = ethylene; MA = methyl acrylate; GMA = glycidyl methacrylate; VA = vinyl acetate
[1] Kg catalyst per 100 kg polymer
[2] Total solvent in monomer solution, catalyst solution and separate feed stream, composed of t-butyl alcohol/methyl alcohol, 80/20 by weight.

The melt indices of the copolymers useful in the compositions of this invention are about 0.1 to 30 at 190° C. as determined by ASTM-D-1238-52T. The preferred melt indices are 0.1 to 10.

The copolymers of the present invention can be vulcanized for about 1 to 60 minutes at about 150° to 200° C., preferably 5 to 10 minutes at 160° to 177° C., in the presence of certain piperazinium dicarboxylate salts. Suitable piperazinium dicarboxylate salts are those derived from alkyl, aryl and aralkyl carboxylic acids having a $pK_a$ value (25° C.) ranging from 4.0 to 5.2. Suitable carboxylic acids include benzoic acid, 2-pentenoic acid, acetic acid, n-hexanoic acid, n-propionic acid, stearic acid, trimethyl acetic acid, n-butyric acid, n-caproic acid, iso-butyric acid, 3,4-dimethoxy-phenylacetic acid, phenylacetic acid, n-heptoic acid, p-methoxyphenylacetic acid, p-phenoxybenzoic acid, 2,4-dimethoxybenzoic acid, p-toluic acid, valeric acid and isovaleric acid.

Piperazinium dicarboxylate salts derived from weak acids with pKa values in the range of 4.0 to 5.2 provide fast cure rates at 177° C. which are 4 to 5 times faster than with an equivalent amount of free piperazine. At 150° C., the cure rates are from 2 to 4 times as fast as with piperazine. In contrast, piperazinium salts derived from strong acids having a pKa $\leq 3.75$ have much slower cure rates as shown in Table III below.

The amount of piperazinium dicarboxylate salt used in the curing of the compositions of the present invention ranges from 0.21 to 0.87 mole per mole of glycidyl(-meth)acrylate in the copolymer. However, the fastest cure rates, lowest compression sets, highest $M_{100}$ values, lowest $E_B$ and CS values, and the best heat aging properties are obtained using a stoichiometric amount of piperazinium dicarboxylate salt, i.e. a molar amount equal to ½ the molar amount of glycidyl(meth)-acrylate in the copolymer.

Piperazinium diacetate is particularly preferred for curing the compositions of the present invention and combines very fast cure rates at 177° C. with excellent processing safety (long Mooney scorch times) at 121° C. and provides vulcanizates with good heat aging properties.

The piperazinium dicarboxylate salts can be prepared by adding a solution of 1 molar equivalent of piperazine in 95% ethanol or tetrahydrofuran to a solution of 2 molar equivalents of the requisite carboxylic acid in the same solvent at ambient temperature and under a nitrogen atmosphere. After the addition is complete, the reaction mixture is stirred for 0.5 hour, cooled to −5° C. and filtered. The filtered product is washed with fresh solvent and dried overnight in a vacuum oven at 50° C. Yields are greater than 97% of the theoretical yield. The piperazinium salts are obtained in a very finely divided state and are suitable for use in the invention compositions without further particle size reduction. Table II summarizes the preparation and properties of a number of piperazinium dicarboxylate salts falling within the scope of this invention as well as others falling outside the invention scope and which will be used for comparative purposes as described hereinafter.

TABLE II
PREPARATION AND PROPERTIES OF PIPERAZINIUM SALTS

| Piperazinium Di- | Yield % | % N Found | % N Theory | Melting Point °C.[1] |
|---|---|---|---|---|
| Formate | — | 15.6 | 15.7 | 98–99 |
| Hexanoate | 78.1 | 8.8 | 8.8 | 112–114 |
| Propionate | 67.2 | 11.9 | 12.0 | 120–121 |
| Trichloroacetate | 98.1 | 6.8 | 6.8 | 122–123 |
| 2-Pentenoate | 59.7 | 9.6 | 9.8 | 132–133 |
| Chloroacetate | 95.7 | 10.0 | 10.2 | 142–143 |
| Trimethylacetate | 52.0 | 9.6 | 9.6 | 153–154 |
| 2,4-Dimethoxybenzoate | 93.5 | 6.1 | 6.2 | 182–184 |
| Benzoate | 93.0 | 8.4 | 8.5 | 185–187 |
| Dichloroacetate | 90.1 | 8.0 | 8.1 | 190–191 |
| Acetate | 97.0 ± 1 | 13.2 ± 2 | 13.6 | 218 |
| Salicylate | 99.0 | 7.5 | 7.7 | 231–232 |

[1] Sealed tube

The vulcanizates of the present invention can also contain an antioxidant of the phosphorous ester type or the amine type or a mixture of the two.

Suitable phosphorus ester compounds include: tri(mixed mono- and dinonylphenyl) phosphite tris(3,5-di-t-butyl-4-hydroxyphenyl)phosphate tricresyl phosphate a high M.W. poly(phenolic phosphonate) 6-(3,5-di-t-butyl-4-hydroxy)benzyl-6H-dibenz-[c,e]-[1,2]oxaphosphorin-6-oxide Suitable amine antioxidants include polymerized 2,2,4-trimethyl-1,2-dihydroquinoline, N-phenyl-N'-(p-toluenesulfonyl)-p-phenylenediamine, N,N'-di(β-naphthyl)-p-phenylenediamine; the low temperature reaction product of phenyl (β-naphthyl)amine and acetone, and 4,4'-bis-(α,α-dimethylbenzyl) diphenylamine.

The proportion of antioxidant in the vulcanizable composition is about 0.1 to 5 parts, preferably 1 to 3 parts, per 100 parts copolymer (phr).

A preferred antioxidant composition consists of a 1 to 1 by weight mixture of tris(mixed mono- and dinonylphenyl)phosphite and 4,4'-bis-(α,α-dimethylbenzyl) diphenylamine.

Fillers can be added to reduce cost and to improve the mechanical properties of the vulcanizate. A typical vulcanizable composition will usually contain from 0 to 125 phr, preferably from 40 to 60 phr, of a carbon black filler.

The following examples illustrate this invention. All parts, percentages and proportions are by weight unless otherwise specified.

EXAMPLES 1-12

The rubber stocks for each of the examples were prepared by mixing on a water cooled two-roll rubber mill at room temperature 100 parts of a 44.5 E/52.1 MA/3.4 GMA copolymer containing 0.024 mole GMA (Copolymer A, Table I), 50 parts of SRF carbon black, 1 part of tri(mixed mono- and dinonylphenyl)phosphite, 1 part of 4,4'-bis-(α,α-dimethylbenzyl)diphenylamine and 0.012 mole of a piperazinium dicarboxylate salt curing agent of the type specified in Table III.

The cure rates of the compounded stocks were determined by measuring the maximum slope of Oscillating Disc Rheometer (ODR) curves at 150° and 177° C. according to ASTM Method D-2084-75. The maximum cure rate was obtained by drawing a tangent at the steepest part of the rise of the curing curve on a plot of torque (dN.m) versus time (min.) and dividing the height of the tangent by the time required to transverse that height. Processing safety of the compounded stocks was determined by measuring the Mooney scorch at 100° and 121° C. according to ASTM Method D-1646-74 (time in minutes to a 10 point rise in Mooney viscosity). Compression set resistance was measured after 70 hours at 150° C. by ASTM Method D395-69 (Method B) on Yerzley pellets curred for 20 minutes at 177° C. and on pellets which were subsequently post cured for 4 hours at 177° C.

Table III summarizes the results obtained using piperazinium dicarboxylate salts derived from carboxylic acids varying in acidity as indicated by the $pK_a$ values of the free acids. Piperazinium salts of carboxylic acids falling in the $pK_a$ range of 4.0 to 5.2 (Examples 1 to 6) cured the copolymer 4 to 5 times as fast as an equivalent amount of free piperazine (Example 12) at 177° C. A similar increase in cure rate at 150° C. was obtained for all of the salts except piperazinium diacetate (Example 3) which cured the copolymer 1.7 times as fast as piperazine. In contrast, piperazinium salts of strong carboxylic acids having $pK_a$ values ≦3.75 (Examples 7-11) had very slow cure rates.

Mooney scorch times of Examples 1, 2 and 4 to 6 at 100° C. are considerably greater than at 121° C. Thus, vulcanizates containing these salts should be processed at stock temperatures below 100° C. to insure adequate processing safety.

Piperazinium diacetate (Example 3) combines very rapid cure rates at 177° C. and excellent processing safety at 121° C.

Compression sets after 70 hours at 150° C. of vulcanizates containing piperazinium salts derived from carboxylic acids having pKa values from 4.0 to 5.2 are very similar.

TABLE III
E/MA/GMA (44.5/52.1/3.4) CURING STUDIES
CURE RATE AND PROCESSING SAFETY OF VARIOUS PIPERAZINIUM SALTS

| Example No. | Salt (PHR) | Acid pKa | Max. ODR Slope, dN·m/min 150° C. | 177° C. | Mooney Scorch Min 100° C. | 121° C. | Comp. Set B ASTM D-395-69 70H/150° C., % A[1] | B[2] |
|---|---|---|---|---|---|---|---|---|
| 1 | Benzoate | (4.08) | 4.20 | 6.3 | 14.7 | 30.5 | 8.0 | 62 | 59 |
| 2 | 2-Pentenoate | (3.54) | 4.52 | 6.1 | 12.9 | 12.5 | 3.3 | 53 | 53 |
| 3 | Acetate | (2.55) | 4.76 | 2.4 | 11.6 | — | 24.5 | 46 | 49 |
| 4 | Hexanoate | (3.94) | 4.86 | 6.6 | 11.8 | 8.2 | 2.5 | 45 | 46 |
| 5 | Propionate | (2.90) | 4.87 | 6.6 | 12.2 | 8.8 | 3.5 | 46 | 46 |
| 6 | Trimethylacetate | (3.59) | 5.05 | 6.9 | 12.9 | 9.0 | 3.4 | 49 | 48 |
| 7 | Trichloroacetate | (5.11) | 0.89 | 1.2 | 3.3 | — | 16.2 | 75 | 49 |
| 8 | Dichloroacetate | (3.40) | 1.30 | — | 0.6 | — | 30 | — | — |
| 9 | Chloroacetate | (4.25) | 2.86 | — | 0.2 | — | 30 | — | — |
| 10 | Salicylate | (4.48) | 2.97 | 0.8 | 5.1 | — | 30 | 83 | 80 |
| 11 | Formate | (2.20) | 3.75 | — | 0.2 | — | 30 | — | — |
| 12 | Piperazine | (1.06) | — | 1.4 | 2.8 | — | 10.2 | 68 | 47 |

[1]A - Press cured 20 minutes at 177° C.
[2]B - Post cured 4 hours at 177° C.

EXAMPLES 13-20

Table IV further compares the ODR cure rate at 177° C., Mooney Scorch at 121° C. and compression set at 150° C. of Copolymer A cured with equivalent amounts (0.012 mole) of piperazine, ethylene-diamine, 1,6-hexanediamine, diethylenetriamine and their respective diacetate salts. In all cases the amine dicarboxylate salt provided a faster cure rate (i.e. maximum ODR slope) than the corresponding free amine. However, the cure rate of piperazinium diacetate (Example 14) was 2 to 3 times faster than the other amine salts (Examples 16, 18 and 20), resulting in a very desirable low $T_c$-90 value of 6.6 minutes, i.e. time to reach 90% of full cure. Mooney scorch times of all four amine salts are satisfactory.

TABLE IV
E/MA/GMA CURING STUDY
CURING CHARACTERISTICS OF AMINES VS AMINE SALTS

| | Example No. | | | |
|---|---|---|---|---|
| | 13 | 14 | 15 | 16 |
| Curative (PHR) | | | | |
| Piperazine | 1.06 | | | |
| Piperazinium diacetate | | 2.55 | | |
| Ethylenediamine | | | 0.74 | |
| 1,2-Ethylenediammonium diacetate | | | | 2.23 |
| ODR, 60 Min at 177° C. | | | | |
| Min. Torque, dN·m | 11.4 | 3.4 | 2.7 | 5.1 |
| Max. Torque, dN·m | 51.5 | 39.2 | 37.0 | 39.9 |
| $T_s$-2.3, min | 2.3 | 1.5 | 6.2 | 2.5 |
| Max. Slope, dN·m/min | 2.8 | 11.6 | 1.1 | 3.8 |
| $T_c$-90, min | 25.0 | 6.6 | 46.0 | 23.0 |
| Mooney Scorch, 121° C. | | | | |
| Minimum Value, Pt | 11.4 | 8.7 | 9.7 | 7.0 |
| Time to 10-Pt. Rise, Min | 10.2 | 24.5 | 32.0 | 24.5 |
| Compression Set, 70 h/150° C., % - Press Cure 20 Minutes at 177° C. | | | | |
| Press Cure | 68 | 46 | 100 | 60 |
| Post Cure - 4 h/177° C. | 47 | 49 | — | 50 |
| | | Example No. | | |

TABLE IV-continued
E/MA/GMA CURING STUDY
CURING CHARACTERISTICS OF AMINES VS AMINE SALTS

|  | 17 | 18 | 19 | 20 |
|---|---|---|---|---|
| Curative (PHR) | | | | |
| 1,6-Hexanediamine | 1.44 | | | |
| 1,6-Hexanediammonium diacetate | | 2.92 | | |
| Diethylenetriamine | | | 1.28 | |
| Diethylenetriammonium triacetate | | | | 3.50 |
| ODR, 60 Min at 177° C. | | | | |
| Min. Torque, dN · m | 3.4 | 4.7 | 3.4 | 4.6 |
| Max. Torque, dN · m | 53.6 | 49.0 | 57.6 | 36.5 |
| $T_s$-2.3, min | 4.0 | 2.5 | 3.4 | 2.5 |
| Max. Slope, dN · m/min | 2.3 | 5.2 | 3.3 | 3.9 |
| $T_c$-90, min | 39.5 | 22.0 | 34.0 | 18.5 |
| Mooney Scorch, 121° C. | | | | |
| Minimum Value, Pt | 10.6 | 7.0 | 11.6 | 5.6 |
| Time to 10-Pt. Rise, Min | 22.0 | 30 | 16.2 | 30 |
| Compression Set, | | | | |
| 70 h/150° C., % - Press Cure 20 Minutes at 177° C. | | | | |
| Press Cure | 94 | 55 | 86 | 66 |
| Post Cure - 4 h/177° C. | — | 44 | — | 62 |

EXAMPLES 21-26

A series of 43.6 E/53.8 MA/2.6 GMA (Polymer B, Table I) vulcanizates containing varying amounts of piperazinium diacetate was prepared using the recipe and procedure described in Examples 1 to 12.

The ODR cure rates at 177° C. and Mooney scorch times at 121° C. were determined as previously described. Tensile properties of the vulcanizates were measured on dumbbells by ASTM Method D-412-68 and heat aging properties by ASTM Method D-573-67.

The results are tabulated in Table V. $M_{100}$, $M_{200}$ and $M_{300}$ are tensile stress values at 100, 200 and 300% elongation in MPa, T is the tensile strength at break in MPa, E is the elongation at break in %, PS is the permanent set at break in %, CS is the compression set in % after 70 hours at 150° C. as measured on Yerzley pellets by ASTM Method D-395-69 (Method B), SH is the Shore hardness on the A scale and R is the % retention of an original property after heat aging.

TABLE V
PROCESSING AND VULCANIZATE PROPERTIES OF PDA-CURED E/MA/GMA

| | Example No. | | | | | |
|---|---|---|---|---|---|---|
| | 21 | 22 | 23 | 24 | 25 | 26 |
| PDA (PHR) | 0.80 | 1.40 | 1.73 | 2.25 | 2.77 | 3.29 |
| Mooney Scorch, 121° C. | | | | | | |
| Minimum | 10 | 11 | 10 | 10 | 9.4 | 9.4 |
| Time to 10-pt rise, min | 30 | 28 | 28 | 27 | 28 | 26 |
| ODR, 60 min at 177° C. | | | | | | |
| Min torque, dN · m | 2.4 | 2.4 | 2.5 | 2.7 | 2.7 | 2.7 |
| Max torque, dN · m | 16.0 | 29.7 | 33.1 | 32.3 | 29.5 | 27.9 |
| Max slope, dN · m/min | 1.8 | 5.6 | 7.1 | 8.5 | 9.0 | 9.0 |
| TC-90, minutes | 19.0 | 11.0 | 9.5 | 6.8 | 5.2 | 4.7 |
| Vulcanizate Properties-Press Cure, 60 Minutes at 177° C. | | | | | | |
| Original | | | | | | |
| $M_{100}$ | 1.9 | 2.1 | 2.4 | 2.4 | 2.1 | 1.9 |
| $M_{200}$ | 3.4 | 5.2 | 5.7 | 5.5 | 5.0 | 4.3 |
| $M_{300}$ | 5.7 | 7.9 | 8.8 | 8.3 | 7.7 | 6.8 |
| T | 14.3 | 15.0 | 14.9 | 15.0 | 15.3 | 13.6 |
| E | 770 | 580 | 540 | 560 | 595 | 610 |
| PS | 49 | 21 | 18 | 17 | 19 | 18 |
| SH | 55 | 57 | 57 | 57 | 56 | 57 |
| CS | | | | | | |
| Press Cure | 87 | 61 | 56 | 59 | 66 | 70 |
| Post cure, 2 h at 150° C. | 86 | 64 | 60 | 62 | 67 | 68 |
| Post cure, 4 h at 150° C. | 81 | 57 | 53 | 57 | 62 | 66 |
| Post cure, 24 h at 150° C. | 62 | 49 | 47 | 45 | 54 | 56 |
| After Oven Aging 7 Days at 177° C. | | | | | | |
| $M_{100}$ (R) | 6.0 (316) | 5.9 (281) | 4.1 (171) | 4.0 (167) | 4.0 (190) | 4.1 (216) |
| T (R) | 17.9 (125) | 19.0 (127) | 18.1 (121) | 18.3 (122) | 18.0 (118) | 18.3 (135) |
| E (R) | 200 (26) | 240 (41) | 270 (50) | 300 (54) | 315 (53) | 310 (51) |
| After Oven Aging 14 Days at 177° C. | | | | | | |
| $M_{100}$ (R) | 8.4 (442) | 6.0 (286) | 4.4 (183) | 3.7 (154) | 3.4 (162) | 4.1 (216) |
| T (R) | 17.3 (119) | 15.5 (103) | 16.1 (108) | 15.0 (100) | 14.8 (97) | 15.0 (110) |
| E (R) | 175 (23) | 190 (33) | 240 (44) | 270 (48) | 290 (49) | 280 (46) |
| After Oven Aging 28 Days at 177° C. | | | | | | |
| $M_{100}$ (R) | — | — | 6.9 (287) | 5.0 (208) | 4.7 (224) | 5.3 (279) |
| T (R) | 9.9 (69) | 9.2 (61) | 9.5 (64) | 8.3 (55) | 7.7 (50) | 9.5 (70) |
| E (R) | 85 (11) | 95 (16) | 120 (22) | 140 (25) | 135 (23) | 145 (24) |
| After Oven Aging 42 Days at 177° C. | | | | | | |
| $M_{100}$ (R) | — | — | — | — | — | — |
| T (R) | 6.2 (43) | 7.3 (49) | 8.0 (54) | 7.4 (49) | 7.6 (50) | 7.8 (57) |
| E (R) | 50 (6) | 40 (7) | 50 (9) | 60 (11) | 60 (10) | 60 (10) |

As can be seen from the data in Table V above, useful vulcanizate properties were obtained using a wide range of piperazinium diacetate (PDA) concentrations. Lowest compression sets and the best heat aging properties were obtained, however, using an amount of PDA equivalent to 0.5 mole of PDA per mole of GMA in the copolymer (1.89 phr for Polymer B). PDA concentrations below the equivalent amount provided lower cure rates and inferior heat aging properties and higher amounts produced higher compression sets. Processing safety of all of the stocks was excellent and was relatively insensitive to PDA concentration.

EXAMPLES 27–32

A series of 68.7 E/28.6 VA/2.7 GMA (Copolymer C, Table I) vulcanizates containing varying amounts of PDA were prepared using the recipe and procedure described in Examples 1–12.

The ODR cure rates at 177° C., Mooney scorch times at 121° C. and tensile properties of the vulcanizates are given in Table VI. The results show that PDA also provides fast cure rates when used in E/VA/GMA copolymers.

TABLE VI
E/28.6 VA/2.7 GMA
CURE RATE AND VULCANIZATE PROPERTIES
VS PDA CONCENTRATION

| | Example No. | | | | | |
|---|---|---|---|---|---|---|
| | 27 | 28 | 29 | 30 | 31 | 32 |
| PDA (PHR) | 0.72 | 1.27 | 1.81 | 2.36 | 2.90 | 3.45 |
| Mooney Scorch, 121° C. | | | | | | |
| Minimum reading | 8.0 | 8.5 | 8.5 | 8.5 | 10.2 | 10.0 |
| Time to 10-pt-point rise, min | >30 | >30 | >30 | >30 | >30 | >30 |
| ODR, 60 min at 177° C. | | | | | | |
| Min torque, dN · m | 4.0 | 5.0 | 4.4 | 4.4 | 4.3 | 4.5 |
| Max torque, dN · m | 8.9 | 17.9 | 26.8 | 34.9 | 37.5 | 35.8 |
| Max slope, dN · m/min | 0.9 | 2.4 | 4.5 | 6.2 | 7.0 | 7.0 |
| Tc-90, min | 12.5 | 10.5 | 9.5 | 9.0 | 8.2 | 7.7 |
| Vulcanizate Properties - Press cure 30 minutes/ 177° C. Original | | | | | | |
| $M_{100}$ | 4.5 | 5.4 | 5.2 | 6.0 | 5.9 | 5.3 |
| $M_{200}$ | 6.2 | 8.8 | 9.5 | 11.4 | 11.6 | 10.0 |
| $M_{300}$ | 7.2 | 11.4 | 13.4 | 16.2 | 16.9 | 14.8 |
| Tensile | 7.2 | 12.8 | 18.4 | 20.7 | 21.6 | 20.5 |
| Elongation | 345 | 400 | 485 | 410 | 400 | 435 |
| Compression Set B, 70 h/150° C. | | | | | | |
| Press cure, 30 min/177° C. | 97 | 85 | 71 | 57 | 51 | 52 |
| Post cure, 4 h/177° C. | 86 | 75 | 62 | 53 | 51 | 52 |

Recipe: E/VA/GMA (100), SRF Black (50), "Polygard" (1), "Naugard" 445 (1), PDA (as shown).

EXAMPLES 33–38

A series of 58.6 E/29.6 MA/7.4 CO/4.5 GMA (Copolymer D, Table I) vulcanizates containing varying amounts of PDA were prepared using the recipe and procedure described in Examples 1 to 12.

The ODR cure rates at 177° C., Mooney scorch times at 121° C. and tensile properties of vulcanizates which were press cured for 60 minutes at 177° C. are given in Table VII. The results again show that PDA provides fast cure rates, excellent processing safety and good tensile properties when used as a curative for E/MA/CO/GMA copolymers.

TABLE VII
E/MA/CO/GMA CURING STUDY
VULCANIZATE AND AGING PROPERTIES
VS PDA CONCENTRATION

| | Example No. | | | | | |
|---|---|---|---|---|---|---|
| | 33 | 34 | 35 | 36 | 37 | 38 |
| PDA (PHR) | 1.31 | 1.96 | 2.61 | 3.26 | 4.24 | 5.22 |
| PDA (Mol/kg) | .064 | .095 | .127 | .158 | .206 | .253 |
| Mooney Scorch, 121° C. | | | | | | |
| Minimum Value | 9.9 | 10.2 | 9.9 | 9.9 | 10.2 | 10.7 |
| 10-Point Rise, Min | 30 | 30 | 30 | >30 | >30 | >30 |
| ODR, 60 Minutes at 177° C. | | | | | | |
| Min. Torque, dN · m | 2.3 | 2.3 | 2.3 | 2.3 | 2.5 | 2.5 |
| Max. Torque, dN · m | 20.4 | 29.7 | 37.0 | 40.0 | 37.1 | 35.4 |
| $T_s$-2.3, Min | 1.2 | 1.4 | 1.2 | 1.2 | 1.1 | 1.1 |
| Max. Slope, dN · m/min | 6.7 | 10.5 | 13.8 | 15.7 | 16.0 | 16.0 |
| $T_c$-90, Min | 5.5 | 4.8 | 4.8 | 4.5 | 3.5 | 4.2 |
| Vulcanizate Properties - Press cure 60 Minutes at 177° C. | | | | | | |
| 100% Modulus, (MPa) | 3.7 | 4.8 | 5.2 | 5.4 | 5.0 | 4.9 |
| 200% Modulus, (MPa) | 7.7 | 9.3 | 10.1 | 10.1 | 9.2 | 8.6 |
| 300% Modulus, (MPa) | 10.5 | 12.1 | — | — | 12.1 | 11.2 |
| Tensile Strength, (MPa) | 13.2 | 12.9 | 12.8 | 12.1 | 12.6 | 12.1 |
| Elongation, % | 370 | 335 | 285 | 275 | 315 | 325 |
| Compression Set B, (70 h/150° C.), % | | | | | | |
| Press cure, 60 min at 177° C. | 86 | 76 | 72 | 71 | 74 | 76 |
| Post cure, 2 h at 150° C. | 83 | 75 | 71 | 70 | 72 | 74 |
| Post cure, 4 h at 150° C. | 82 | 75 | 72 | 71 | 73 | 74 |
| Post cure 24 h at 150° C. | 67 | 69 | 65 | 64 | 66 | 68 |
| 100% Modulus After Oven Aging at 150° C. (MPa) | | | | | | |
| 3 Day | 6.9 | 9.3 | 10.5 | 10.7 | — | 11.2 |
| 7 Day | 11.0 | 12.1 | — | 11.0 | — | — |
| 14 Day | — | — | — | — | — | — |

TABLE VII-continued

E/MA/CO/GMA CURING STUDY VULCANIZATE AND AGING PROPERTIES VS PDA CONCENTRATION

| | Example No. | | | | | |
|---|---|---|---|---|---|---|
| | 33 | 34 | 35 | 36 | 37 | 38 |
| 28 Day | — | — | — | — | — | — |
| Tensile Strength After Aging at 150° C. (MPa) | | | | | | |
| 3 Day | 11.4 | 13.9 | 14.3 | 12.7 | 10.7 | 13.4 |
| 7 Day | 11.0 | 12.1 | 11.3 | 11.0 | 12.9 | 12.9 |
| 14 Day | 8.3 | 10.1 | 9.8 | 9.8 | 10.1 | 9.6 |
| 28 Day | 8.6 | 8.0 | 9.1 | 10.1 | 9.5 | 9.5 |
| Elongation After Aging at 150° C., % (R) | | | | | | |
| 3 Day | 145 (39) | 140 (42) | 130 (46) | 115 (42) | 80 (25) | 115 (35) |
| 7 Day | 100 (27) | 100 (30) | 95 (33) | 100 (36) | 85 (27) | 85 (26) |
| 14 Day | 60 (16) | 65 (19) | 70 (25) | 80 (25) | 70 (22) | 70 (22) |
| 28 Day | 45 (12) | 40 (12) | 50 (18) | 60 (22) | 55 (17) | 50 (17) |

Industrial Applicability

The vulcanizable compositions of the present invention can be used in a wide variety of industrial applications, including ignition wire jacketing, spark plug boots, hoses, belts, miscellaneous molded boots, seals and gaskets.

Best Mode

Although the best mode of the present invention, i.e., the single best composition of the present invention, will depend upon the particular desired end use and the specific requisite combination of properties for that use, the single most preferred composition of the present invention is that described in detail in Examples 3 and 14. Alternatively, if high cure rates and high cure states are desired, higher concentrations of the cure-site monomer would be preferred.

I claim:

1. A vulcanizable elastomeric composition comprising a copolymer consisting essentially of copolymerized units of:
   (a) 25–65 weight percent of a comonomer selected from the group consisting of acrylic and vinyl esters, provided that the acrylic ester is other than glycidyl acrylate and glycidyl methacrylate,
   (b) 2–10 weight percent of a cure-site monomer selected from the group consisting of glycidyl acrylate and glycidyl methacrylate,
   (c) 0–15 weight percent carbon monoxide, and
   (d) a complemental amount of ethylene from 30–70 weight percent,
and a curing agent selected from the group consisting of piperazinium dicarboxylate salts derived from the acids with pKa values in the range of 4.0–5.2.

2. The composition of claim 1 wherein
   (a) the comonomer comprises 50–60 weight percent,
   (b) the cure-site monomer comprises 2–5 weight percent, and
   (c) the ethylene comprises 35–50 weight percent.

3. The compositon of claim 1 wherein the comonomer is selected from the group consisting of $C_4$–$C_7$ alkyl acrylates, $C_5$–$C_8$ alkyl methacrylates, and $C_3$–$C_6$ vinyl esters.

4. The composition of claim 1 wherein the comonomer is methyl acrylate.

5. The composition of claim 1 wherein the cure-site monomer is glycidyl methacrylate.

6. The composition of claim 1 wherein the curing agent is piperazinium diacetate.

7. The composition of claim 1 wherein the copolymer consists essentially of copolymerized units of:
   (a) about 52.1 weight percent methyl acrylate,
   (b) about 3.4 weight percent glycidyl methacrylate, and
   (c) about 44.5 weight percent ethylene.

8. A method of vulcanizing an elastomeric composition, said composition comprising a copolymer consisting essentially of copolymerized units of:
   (a) 25–62 weight percent of a comonomer selected from the group consisting of acrylic and vinyl esters, provided that the acrylic ester is other than glycidyl acrylate and glycidyl methacrylate,
   (b) 2–10 weight percent of a cure-site monomer selected from the group consisting of glycidyl acrylate and glycidyl methacrylate,
   (c) 0–15 weight percent carbon monoxide, and
   (d) a complemental amount of ethylene from 30–70 weight percent,
said method comprising mixing with said composition a curing agent selected from the group consisting of piperazinium dicarboxylate salts derived from acids with pKa values in the range of 4.0–5.2, and then heating the resulting mixture.

9. The method of claim 8 wherein the curing agent is mixed with said composition in an amount of 0.21–0.87 moles moles of curing agent per mole of cure-site monomer in the composition.

10. The method of claim 8 wherein
   (a) the comonomer comprises 50–60 weight percent of the composition,
   (b) the cure-site monomer comprises 2–5 weight percent of the composition, and
   (c) the ethylene comprises 35–50 weight percent of the composition.

11. The method of claim 8 wherein
   (a) the comonomer is methyl acrylate,
   (b) the cure-site monomer is glycidyl methacrylate, and
   (c) the curing agent is piperazinium diacetate.

12. Vulcanized articles produced from the composition of claim 1.

* * * * *